(12) United States Patent
Lee et al.

(10) Patent No.: US 8,878,784 B2
(45) Date of Patent: *Nov. 4, 2014

(54) ON-SCREEN DIAGONAL CURSOR NAVIGATION ON A HANDHELD COMMUNICATION DEVICE

(75) Inventors: Matthew Lee, Belleville (CA); Andrew Bocking, Waterloo (CA); David Mak-Fan, Waterloo (CA); Steven Fyke, Waterloo (CA); Matthew Bells, Waterloo (CA)

(73) Assignee: BlackBerry Limited, Waterloo Ontario (CA)

( * ) Notice: Subject to any disclaimer, the term of this patent is extended or adjusted under 35 U.S.C. 154(b) by 785 days.

This patent is subject to a terminal disclaimer.

(21) Appl. No.: 11/423,740

(22) Filed: Jun. 13, 2006

(65) Prior Publication Data

US 2007/0188462 A1 Aug. 16, 2007

Related U.S. Application Data

(60) Provisional application No. 60/773,145, filed on Feb. 13, 2006, provisional application No. 60/773,799, filed on Feb. 14, 2006.

(51) Int. Cl.
*G06F 3/033* (2013.01)
*G06F 3/0354* (2013.01)
(Continued)

(52) U.S. Cl.
CPC ......... *G06F 3/04812* (2013.01); *Y02B 60/1282* (2013.01); *Y02B 60/1278* (2013.01); *G06F 3/03549* (2013.01); *G06F 3/038* (2013.01); *G06F 1/1626* (2013.01); *Y10S 707/99944* (2013.01); *G06F 1/1662* (2013.01);
(Continued)

(58) Field of Classification Search
CPC ........ G06F 1/1626; G06F 1/1662; G09G 5/08
USPC ......... 345/156, 179, 184, 161–167, 157, 160, 345/168, 169; 455/556.1, 566, 556.2
See application file for complete search history.

(56) References Cited

U.S. PATENT DOCUMENTS 4,180,336 A 12/1979 Lonsdale
5,319,582 A 6/1994 Ma
(Continued)

FOREIGN PATENT DOCUMENTS

DE 19743283 C1 2/1999
JP 359178531 A * 10/1984 .................... 345/160

OTHER PUBLICATIONS

European Search Report for EP06253036, Issued on Sep. 20, 2006.

(Continued)

*Primary Examiner* — Lun-Yi Lao
*Assistant Examiner* — Olga Merkoulova
(74) *Attorney, Agent, or Firm* — Jose Gutman; Fleit Gibbons Gutman Bongini & Bianco PL

(57) ABSTRACT

Method and arrangement for affecting diagonal movement of a cursor 171 on a display screen 322 of a handheld communication device 300. The method includes sensing movement at an auxiliary user input 328 of the handheld communication device 300 indicative of a user's desire to affect diagonal movement of the cursor 171 on the display screen 322 of the handheld communication device 300. X-direction signals and Y-direction signals are produced based on the sensed movement at the auxiliary user input 328. During that time while necessary signals are being collected and processed, the cursor 171 is held steady on the display screen 322 until a predetermined criterion is met for discriminating whether the user has indicated x-direction cursor movement, y-direction cursor movement or diagonal cursor movement.

26 Claims, 12 Drawing Sheets

(51) Int. Cl.

| | | |
|---|---|---|
| *G06F 3/038* | (2013.01) | |
| *G06F 1/16* | (2006.01) | |
| *G06F 1/32* | (2006.01) | |
| *H04W 52/02* | (2009.01) | |
| *G06F 3/0338* | (2013.01) | |
| *G06F 3/0481* | (2013.01) | |
| *G06F 3/0489* | (2013.01) | |
| *H04M 1/725* | (2006.01) | |
| *H04M 1/23* | (2006.01) | |

(52) U.S. Cl.
CPC ......... *H04M 2250/56* (2013.01); *G06F 1/3265* (2013.01); *H04W 52/0267* (2013.01); *G06F 3/0338* (2013.01); *G06F 1/3228* (2013.01); *Y02B 60/50* (2013.01); *Y02B 60/1242* (2013.01); *G06F 1/3287* (2013.01); *Y10S 707/99943* (2013.01); *G06F 3/0481* (2013.01); *G06F 3/04892* (2013.01); *H04M 2250/12* (2013.01); *H04W 52/027* (2013.01); *Y10S 707/99945* (2013.01); *G06F 1/3259* (2013.01); *Y02B 60/1253* (2013.01); *H04M 1/233* (2013.01); *Y10S 707/99948* (2013.01); *G06F 1/1656* (2013.01); *Y10S 707/99942* (2013.01); *G06F 1/3203* (2013.01); *H04W 52/0254* (2013.01); *H04M 1/72522* (2013.01); *G06F 1/169* (2013.01); *G06F 1/3215* (2013.01); *G06F 1/1664* (2013.01); *G09G 2330/021* (2013.01)
USPC .......... 345/157; 345/161; 345/169; 345/163; 345/160; 345/184; 455/556.1; 455/556.2; 455/566; 707/999.103; 707/999.102; 707/999.104; 707/999.107; 707/999.101

(56) References Cited

U.S. PATENT DOCUMENTS

| | | | | |
|---|---|---|---|---|
| 5,327,161 | A * | 7/1994 | Logan et al. | 345/157 |
| 5,448,261 | A * | 9/1995 | Koike et al. | 345/158 |
| 5,481,278 | A * | 1/1996 | Shigematsu et al. | 345/179 |
| 5,631,673 | A | 5/1997 | Yamamoto | |
| 5,764,474 | A | 6/1998 | Youens | |
| 5,903,259 | A | 5/1999 | Brusky | |
| 5,903,289 | A | 5/1999 | Takayanagi | |
| 5,912,659 | A * | 6/1999 | Rutledge et al. | 345/156 |
| 5,945,979 | A * | 8/1999 | Rutledge et al. | 345/161 |
| 6,097,371 | A | 8/2000 | Siddiqui | |
| 6,171,003 | B1 | 1/2001 | Lo | |
| 6,480,185 | B1 | 11/2002 | Kiljander | |
| 6,487,396 | B1 | 11/2002 | Sassi | |
| 6,525,714 | B1 | 2/2003 | Varga et al. | |
| 6,583,784 | B1 * | 6/2003 | Helmbrecht | 345/167 |
| 6,959,208 | B2 | 10/2005 | Tanaka | |
| 6,961,052 | B1 * | 11/2005 | Vaziri | 345/184 |
| 7,067,757 | B1 | 6/2006 | Chadha | |
| 7,083,342 | B2 | 8/2006 | Griffin | |
| 7,102,626 | B2 * | 9/2006 | Denny, III | 345/179 |
| 7,133,706 | B2 | 11/2006 | Kespohl | |
| 7,177,604 | B2 | 2/2007 | Wong | |
| 7,206,599 | B2 | 4/2007 | Lemley | |
| 7,231,229 | B1 | 6/2007 | Hawkins | |
| 7,274,354 | B2 | 9/2007 | Yamamoto | |
| 7,394,456 | B2 | 7/2008 | Kim | |
| 7,417,565 | B2 | 8/2008 | Griffin | |
| 7,461,105 | B2 | 12/2008 | Wiggeshoff | |
| 7,511,700 | B2 | 3/2009 | Skillman | |
| 7,525,534 | B2 | 4/2009 | Skillman | |
| 7,532,198 | B2 | 5/2009 | Lazaridis | |
| 2002/0030667 | A1 * | 3/2002 | Hinckley et al. | 345/173 |
| 2002/0135565 | A1 | 9/2002 | Gordon | |
| 2003/0020692 | A1 | 1/2003 | Griffin | |
| 2004/0001105 | A1 | 1/2004 | Chew | |
| 2004/0017354 | A1 | 1/2004 | Muranami | |
| 2004/0125083 | A1 | 7/2004 | Lengeling et al. | |
| 2004/0165924 | A1 | 8/2004 | Griffin | |
| 2004/0212586 | A1 | 10/2004 | Denny et al. | |
| 2005/0041014 | A1 * | 2/2005 | Slotznick | 345/156 |
| 2005/0140653 | A1 * | 6/2005 | Pletikosa et al. | 345/168 |
| 2006/0022947 | A1 | 2/2006 | Griffin | |
| 2006/0026535 | A1 * | 2/2006 | Hotelling et al. | 715/863 |
| 2006/0026536 | A1 | 2/2006 | Hotelling et al. | 715/863 |
| 2006/0052145 | A1 | 3/2006 | Go | |
| 2006/0055789 | A1 * | 3/2006 | Jin et al. | 348/208.12 |
| 2006/0097995 | A1 * | 5/2006 | Nagayasu | 345/173 |
| 2006/0146026 | A1 | 7/2006 | Shim | |
| 2006/0164399 | A1 * | 7/2006 | Cheston et al. | 345/173 |
| 2007/0002027 | A1 * | 1/2007 | Lii et al. | 345/173 |
| 2007/0220448 | A1 * | 9/2007 | Trewin | 715/856 |
| 2007/0281675 | A1 | 12/2007 | Pletikosa | |
| 2008/0057941 | A1 | 3/2008 | Scott | |
| 2008/0057985 | A1 | 3/2008 | Tao | |

OTHER PUBLICATIONS

European Search Report for EP06253032, Issued on Sep. 20, 2006.
European Search Report for EP06253037, Issued on Sep. 20, 2006.
European Search Report for EP06253068, Issued on Sep. 20, 2006.
Office Communication dated Feb. 25, 2013 in Canadian Application No. 2,591,465.

* cited by examiner

Sample
10 consecutive signals

| ↑ X | ← Y | ↑ X | ↑ X | ← Y | ↑ X | ↑ X | ← Y | ↑ X | ← Y |

Criterion
Desired Diagonal Cursor Movement    X ≥ 4    and    Y ≥ 4

Pattern
Identified    X = 6    and    Y = 4

ON-SCREEN DIAGONAL CURSOR NAVIGATION ON A HANDHELD COMMUNICATION DEVICE

CROSS-REFERENCE TO RELATED APPLICATIONS

The present application claims the benefit of U.S. Provisional Application Nos. 60/773,145 filed 13 Feb. 2006 and 60/773,799 filed 14 Feb. 2006. Said applications are expressly incorporated herein by reference in their entireties.

FIELD

The present disclosure is directed toward a wireless handheld communication device, and more particularly, to the navigation among menu and icon items displayed on a screen of such a device.

BACKGROUND

With the advent of more robust wireless communications systems, compatible handheld communication devices are becoming more prevalent, as well as advanced. In a broader sense, these devices are referred to as handheld electronic devices, which include devices without communication functions. Where in the past such handheld communication devices typically accommodated either voice (cell phones) or text transmission (pagers and PDAs), today's consumer often demands a combination device capable of performing both types of transmissions, including sending and receiving e-mail. The suppliers of such mobile communication devices and underlying service providers are anxious to meet these demands, but the combination of voice and textual messaging, as well as other functionalities such as those found in PDAs, have caused designers to have to improve the means by which information is input into the devices by the user, as well as provide better facilitation for the user to navigate within the menus and icon presentations necessary for efficient user interface with these more complicated devices.

For many reasons, screen icons are often utilized in such handheld communication devices as a way to allow users to make feature and/or function selections. Among other reasons, users are accustomed to such icon representations for function selection. A prime example is the personal computer "desktop" presented by Microsoft's Windows® operating system. Because of the penetration of such programs into the user markets, most electronics users are familiar with what has basically become a convention of icon-based functionality selections. Even with many icons presented on a personal computer's "desktop", however, user navigation and selection among the different icons is easily accomplished utilizing a conventional mouse and employing the point-and-click methodology. The absence of such a mouse from these handheld wireless communication devices, however, has caused a different protocol to develop for icon navigation and selection.

As depicted in FIG. 1, the icons (squares 1, 2, 3 and 4) displayed on the screen of the device are typically presented in an array of uniform rows and columns. As an example, a home screen might present icons for telephone, e-mail, calendar and contact functions. Because there is no "mouse," other auxiliary navigational tools are typically provided for user manipulation in affecting movement between the different icons on a handheld device. Such navigational tools have included rotatable thumb wheels, joysticks, touchpads, four-way cursors and the like. In the present description, a trackball is also disclosed as a navigational tool for enabling a user to move about displayed icons. The navigational tool is a type of auxiliary input device and hereinbelow the navigational tool maybe described more generally as an auxiliary user input.

In the trackball instance, current technology calls for the utilization of paired sensors located about the trackball for sensing rotational motion of the trackball which is representative of the desired direction the user would like the cursor to move on the screen, including a highlighting cursor that moves discretely amongst screen-displayed icons. The trackball itself is capable of free rotation within its receiving socket which gives the user an impression that he or she can direct cursor motion on the screen (be it an icon highlighting cursor or a more traditional cursor such as a floating arrowhead) in any direction desired within the area of the display screen.

A constraint of the sensor configuration has been that even though the trackball enjoys free rotation, its rotational movement must be resolved into X and Y components via the motion sensors. Therefore, until now, movement between icons has been limited to up, down and sideways motion. More specifically, diagonal movement between icons has not been previously facilitated. As an example, and returning again to FIG. 1, if the user desired to move from icon "1" to icon "4", execution would have to be either over to icon "2" and down to icon "4" or down to icon "3" and over to icon "4". A similar situation exists when navigating across such applications as spreadsheets composed of a grid of cells where diagonal cell-to-cell movement can be desirable, but until now, undesirable zigzag cursor motion has been required.

Since these limitations are counterintuitive given the fact the trackball enjoys free rotation but the user cannot move diagonally from icon to icon in a single step, frustration and product dissatisfaction are likely. Therefore, a primary aspect of the presently disclosed solution is the enablement of such direct diagonal movement between icons, even when the signals developed using the navigational tool are X and Y direction limited.

It should be appreciated that the examples of icon and spreadsheet navigation present a special problem typically not encountered when navigating across continuous screen fields such as, for example, when cursor-traversing a map that is presented on the screen. In the instance of at least trackball navigation, the individual X and Y signal components will normally be fine (small) enough to even be executed on a pixel-by-pixel basis. As a result, in most cases, the user will not be able to visually detect that he or she is getting X-Y stepped movement of the cursor; to the eye, the steps are so small (pixel-by-pixel) that the cursor appears to be moving on a diagonal or smooth curve when accordingly directed. It should be appreciated, however, that there are certain configurations in which the X-Y limited movement is not sufficiently fine and the user perceives an undesirable zig-zag motion of the cursor. Therefore the presently presented solutions focus on enabling a user to diagonally navigate a cursor on a screen of a handheld electronic device by "blending" X and Y direction signals into diagonal signals for affecting diagonal cursor movement, and particularly in environments such as icon fields and spreadsheet matrices, and especially without experiencing undue delay or lag between the input of the instruction and the cursor's actual movement.

BRIEF DESCRIPTION OF THE DRAWINGS

Exemplary methods and arrangements conducted and configured according to the advantageous solutions presented herein are depicted in the accompanying drawings where in:

FIG. 8 illustrates an exemplary Dvorak keyboard layout;

FIG. 9 illustrates a QWERTY keyboard layout paired with a traditional ten-key keyboard;

FIG. 10 illustrates ten digits comprising the numerals 0-9 arranged as on a telephone keypad, including the * and # astride the zero;

FIG. 11 illustrates a numeric phone key arrangement according to the ITU Standard E. 161 including both numerals and letters;

FIG. 19 is a diagram showing an example of a signal sample, a signal pattern criterion, and an identified signal pattern, indicative of desired diagonal cursor movement.

DETAILED DESCRIPTION

Figure 1:
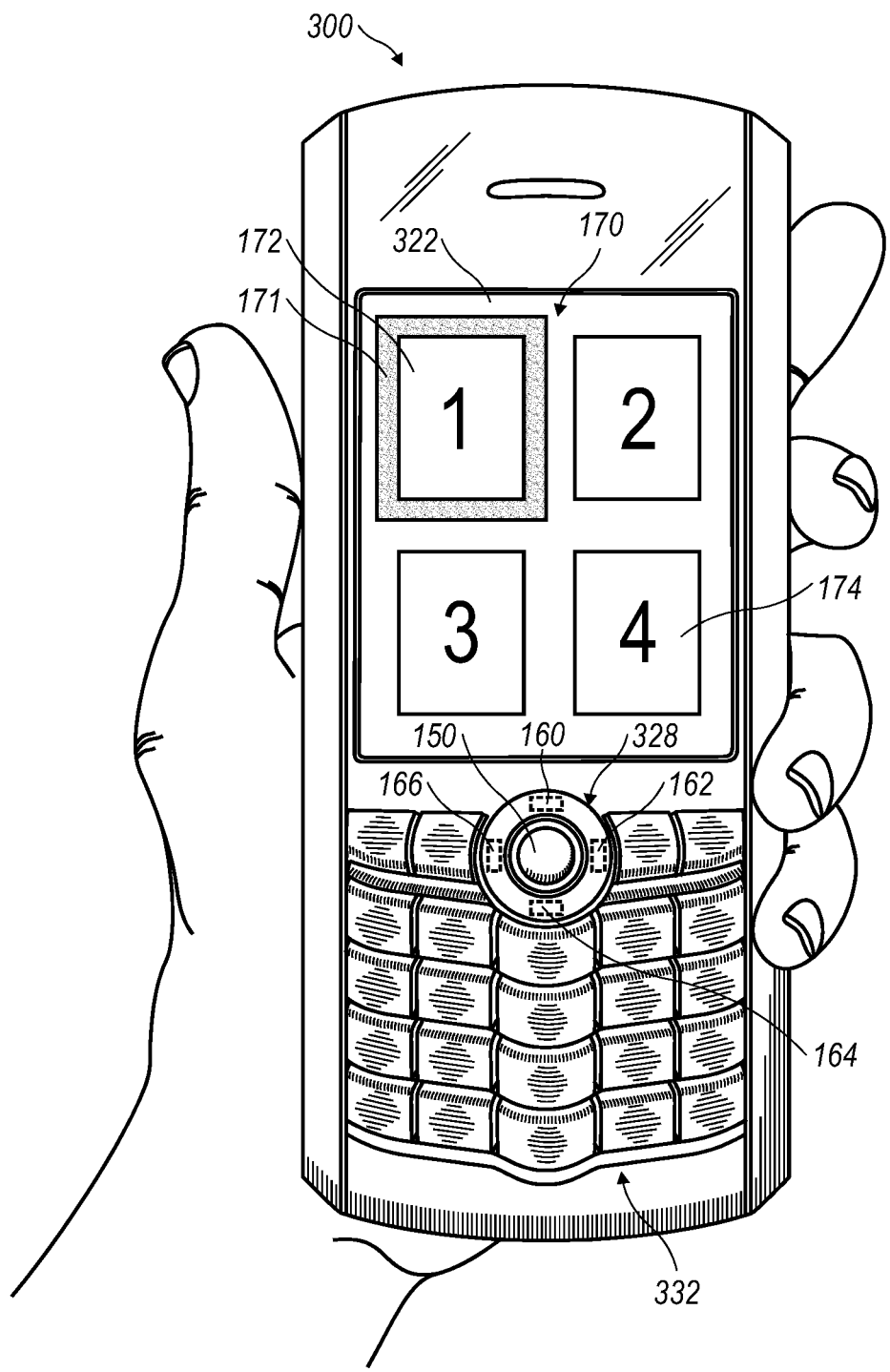
FIG. 1 is a perspective view of a handheld communication device cradled in a user's hand and displaying an array of four icons (1, 2, 3 and 4) on a screen thereof.

As intimated hereinabove, one of the more important aspects of the handheld electronic device to which this disclosure is directed is its size. While some users will grasp the device in both hands, it is intended that a predominance of users will cradle the device in one hand in such a manner that input and control over the device can be affected using the thumb of the same hand in which the device is held. Therefore the size of the device must be kept relatively small; of its dimensions, limiting the width of the device is most important with respect to assuring cradleability in a user's hand. Moreover, it is preferred that the width of the device be maintained at less than ten centimeters (approximately four inches). Keeping the device within these dimensional limits provides a hand cradleable unit that users prefer for its useability and portability. Limitations with respect to the height (length) of the device are less stringent with importance placed on maintaining device hand-cradleablability. Therefore, in order to gain greater size, the device can be advantageously configured so that its height is greater than its width, but still remain easily supported and operated in one hand.

A potential problem is presented by the small size of the device in that there is limited exterior surface area for the inclusion of user input and device output features. This is especially true for the "prime real estate" of the front face of the device where it is most advantageous to include a display screen that outputs information to the user and which is preferably above a keyboard utilized for data entry into the device by the user. If the screen is provided below the keyboard, a problem occurs in being able to see the screen while inputting data. Therefore it is preferred that the display screen be above the input area, thereby solving the problem by assuring that the hands and fingers do not block the view of the screen during data entry periods.

To facilitate textual data entry, an alphabetic keyboard is provided. In one version, a full alphabetic keyboard is utilized in which there is one key per letter. This is preferred by some users because it can be arranged to resemble a standard keyboard with which they are most familiar. In this regard, the associated letters can be advantageously organized in QWERTY, QWERTZ or AZERTY layouts, among others, thereby capitalizing on certain users' familiarity with these special letter orders. In order to stay within the bounds of a limited front surface area, however, each of the keys must be commensurately small when, for example, twenty-six keys must be provided in the instance of the English language. An alternative configuration is to provide a reduced keyboard in which at least some of the keys have more than one letter associated therewith. This means that fewer keys can be included which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation; a problem the full keyboard avoids. Preferably, this character discrimination is accomplished utilizing disambiguation software accommodated within the device. As with the other software programs embodied within the device, a memory and microprocessor are provided within the body of the handheld unit for receiving, storing, processing, and outputting data during use. Therefore, the problem of needing a textual data input means is solved by the provision of either a full or reduced alphabetic keyboard on the presently disclosed handheld electronic device.

Keys, typically of a push-button or push-pad nature, perform well as data entry devices but present problems to the user when they must also be used to affect navigational control over a screen-cursor. In order to solve this problem the present handheld electronic device preferably includes an auxiliary input that acts as a cursor navigational tool and which is also exteriorly located upon the front face of the device. Its front face location is particularly advantageous because it makes the tool easily thumb-actuable like the keys of the keyboard. A particularly usable embodiment provides the navigational tool in the form of a trackball which is easily utilized to instruct two-dimensional screen cursor movement in substantially any direction, as well as act as an actuator when the ball of the trackball is depressible like a button. The placement of the trackball is preferably above the keyboard and below the display screen; here, it avoids interference during keyboarding and does not block the user's view of the display screen during use.

In some configurations, the handheld electronic device may be standalone in that it is not connectable to the "outside world." One example would be a PDA that stores such things as calendars and contact information, but is not capable of synchronizing or communicating with other devices. In most situations such isolation will be detrimentally viewed in that at least synchronization is a highly desired characteristic of handheld devices today. Moreover, the utility of the device is significantly enhanced when connectable within a system, and particularly when connectable on a wireless basis in a system in which both voice and text messaging are accommodated.

As intimated hereinabove, the present solutions are directed to methods and arrangements for facilitating diagonal cursor movement in such environments as icon arrays 170 and spreadsheet grids on a display screen 322 of a relatively small, wireless handheld communication device 300, variously configured as described above, such as that depicted in FIG. 1. One exemplary embodiment takes the form of a method for affecting diagonal movement of a cursor 171 on the display screen 322 of a handheld communication device 300. The method includes sensing movement at an auxiliary user input 328 of the handheld communication device 300 indicative of the user's desire to affect diagonal movement of the cursor 171 on the display screen 322 of the handheld communication device 300. X-direction signals and Y-direction signals are produced based on the sensed movement at the auxiliary user input 328. During that time while the necessary signals are being collected and processed, the cursor 171 is held steady on the display screen 322 until a predetermined criterion is met for discriminating whether the user has indicated x-direction cursor movement, y-direction cursor movement or diagonal cursor movement. In that the processing is typically conducted by a processor 338 according to a resident computer program, the predetermined criterion is either a preset condition or a user definable condition, examples of which are discussed in greater detail hereinbelow. Finally, diagonal cursor movement is affected on the display screen 322 of the handheld communication device 300 when diagonal cursor movement is discriminated to have been user indicated.

Figure 18:
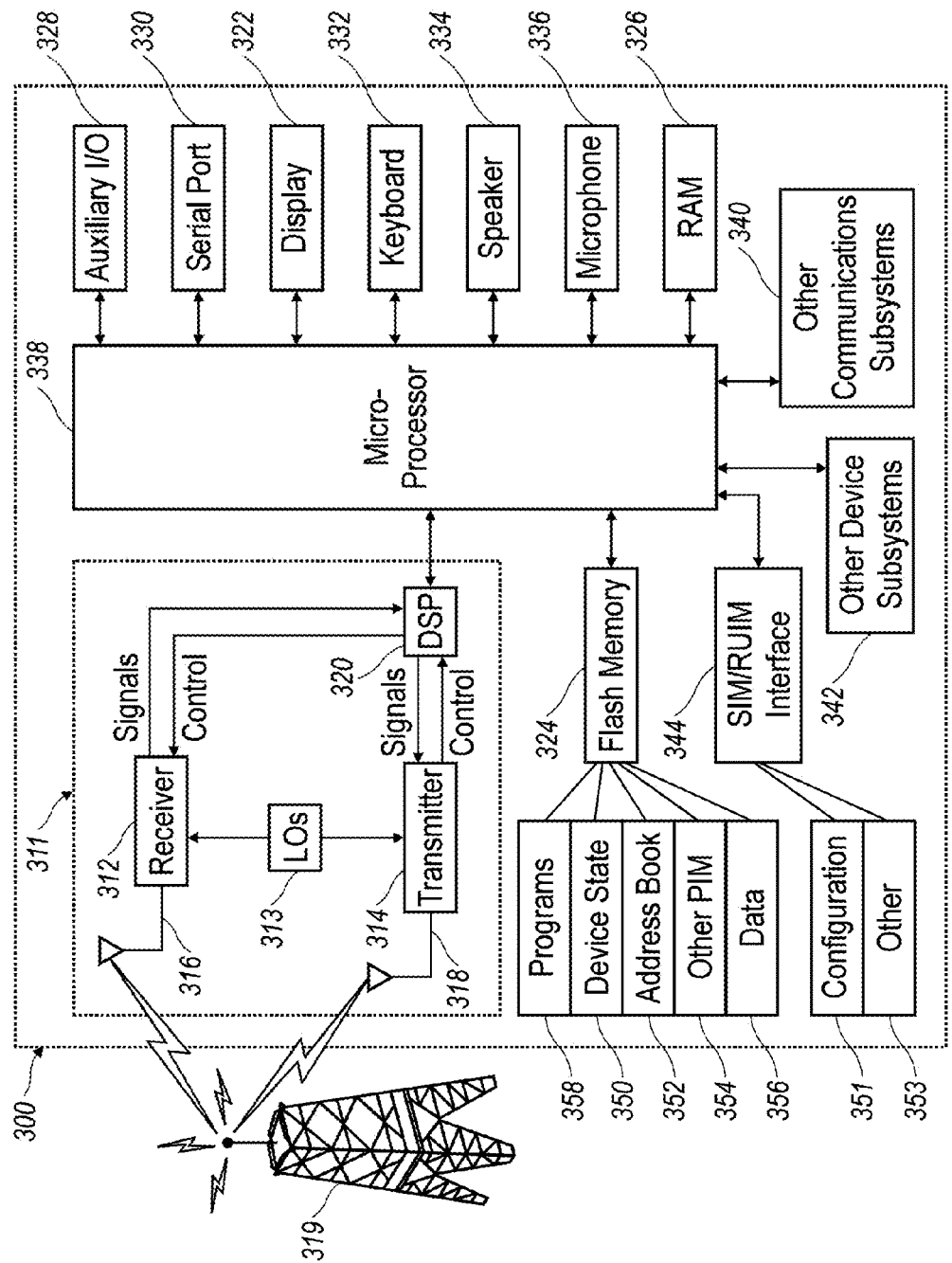
FIG. 18 is a block diagram representing a wireless handheld communication device interacting in a communication network.

As depicted in FIG. 18, the handheld communication device 300 transmits data to, and receives data from a communication network 319 utilizing radio frequency signals, the details of which are discussed more fully hereinbelow. Preferably, the data transmitted between the handheld communication device 300 and the communication network 319 supports voice and textual messaging, though it is contemplated that the method for affecting diagonal cursor movement is equally applicable to single mode devices; i.e. voice-only devices and text-only devices.

As may be appreciated from FIG. 1, the handheld communication device 300 comprises a lighted display 322 located above a keyboard 332 suitable for accommodating textual input to the handheld communication device 300 when in an operable configuration. As shown, the device 300 is of unibody construction, but it is also contemplated that the device may be of an alternative construction such as that commonly known as "clamshell" or "flip-phone" style. Regardless, in the operable configuration for the device 300, the auxiliary user input 328 is located essentially between the display 322 and the keyboard 332.

Figure 12:
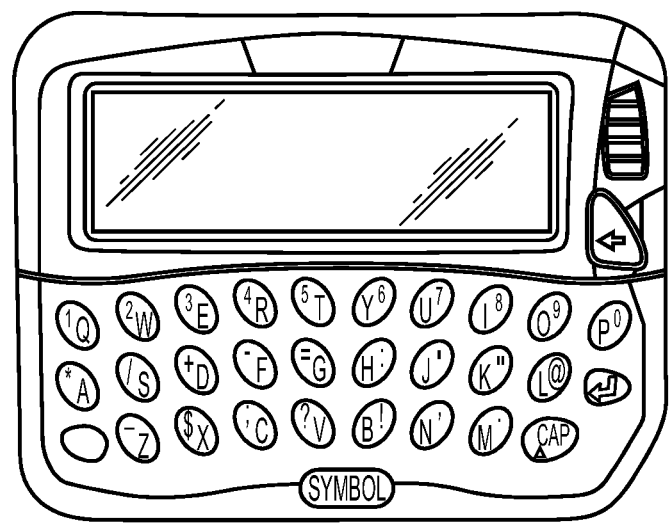
FIG. 12 is a front view of an exemplary handheld electronic device including a full QWERTY keyboard.
Figure 13:
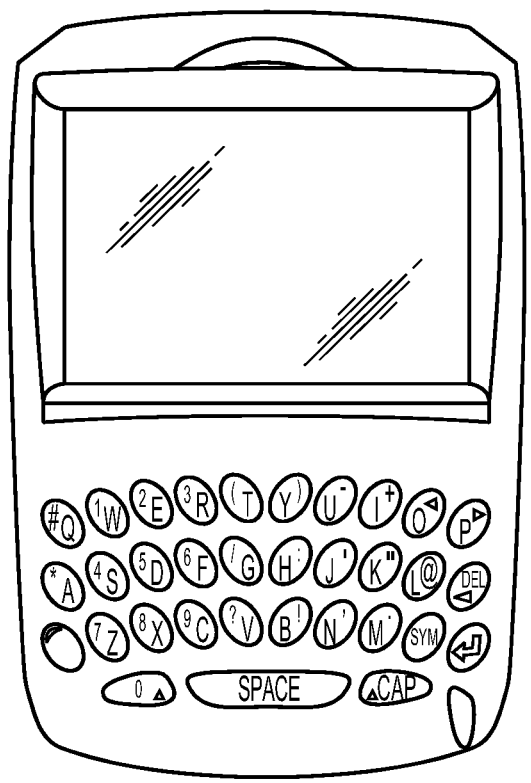
FIG. 13 is a front view of another exemplary handheld electronic device including a full QWERTY keyboard.

In one embodiment, the keyboard 332 comprises a plurality of keys with which alphabetic letters are associated on a one letter per key basis. It is contemplated that the keys may be directly marked with the letters, or the letters may be presented adjacent, but clearly in association with a particular key. This one-to-one pairing between the letters and keys is depicted in FIGS. 12 and 13 and is described in greater detail below in association therewith. In order to facilitate user input, the alphabetic letters are preferably configured in a familiar QWERTY, QWERTZ, AZERTY, or Dvorak layout, each of which is also discussed in greater detail hereinbelow.

In the alternative embodiment of FIG. 1, the keyboard 332 comprises a plurality of keys with which alphabetic letters are also associated, but at least a portion of the individual keys have multiple letters associated therewith. This type of configuration is referred to as a reduced keyboard (in comparison to the full keyboard described immediately above) and can, among others, come in QWERTY, QWERTZ, AZERTY and Dvorak layouts.

As depicted in FIG. 1, the auxiliary user input is a trackball 150. Motion of the trackball 150 is assessed using a plurality of sensors 160, 162, 164, 166 that quantify rotational motion of the trackball 150 about an intersecting x-axis 152 and an intersecting y-axis 154 of the trackball (see FIG. 2).

In one embodiment, the plurality of sensors 160, 162 number two. One of the two sensors 162 outputs signals indicative of x-component rolling motion of the trackball 150 relative to the handheld communication device 300 and about the intersecting y-axis 154 of the trackball (see the rotational arrows about the y-axis in FIG. 2). The other of the two sensors 160 outputs signals indicative of y-component rolling motion of the trackball 150 relative to the handheld communication device 300 and about the intersecting x-axis 152 of the trackball (see the rotational arrows about the x-axis in FIG. 2). In this configuration, the two sensors 160, 162 are oriented radially about the trackball 150 with approximately ninety degree spacing therebetween. In one embodiment, each of the sensors is a hall effect sensor located proximate the trackball.

Figure 2:
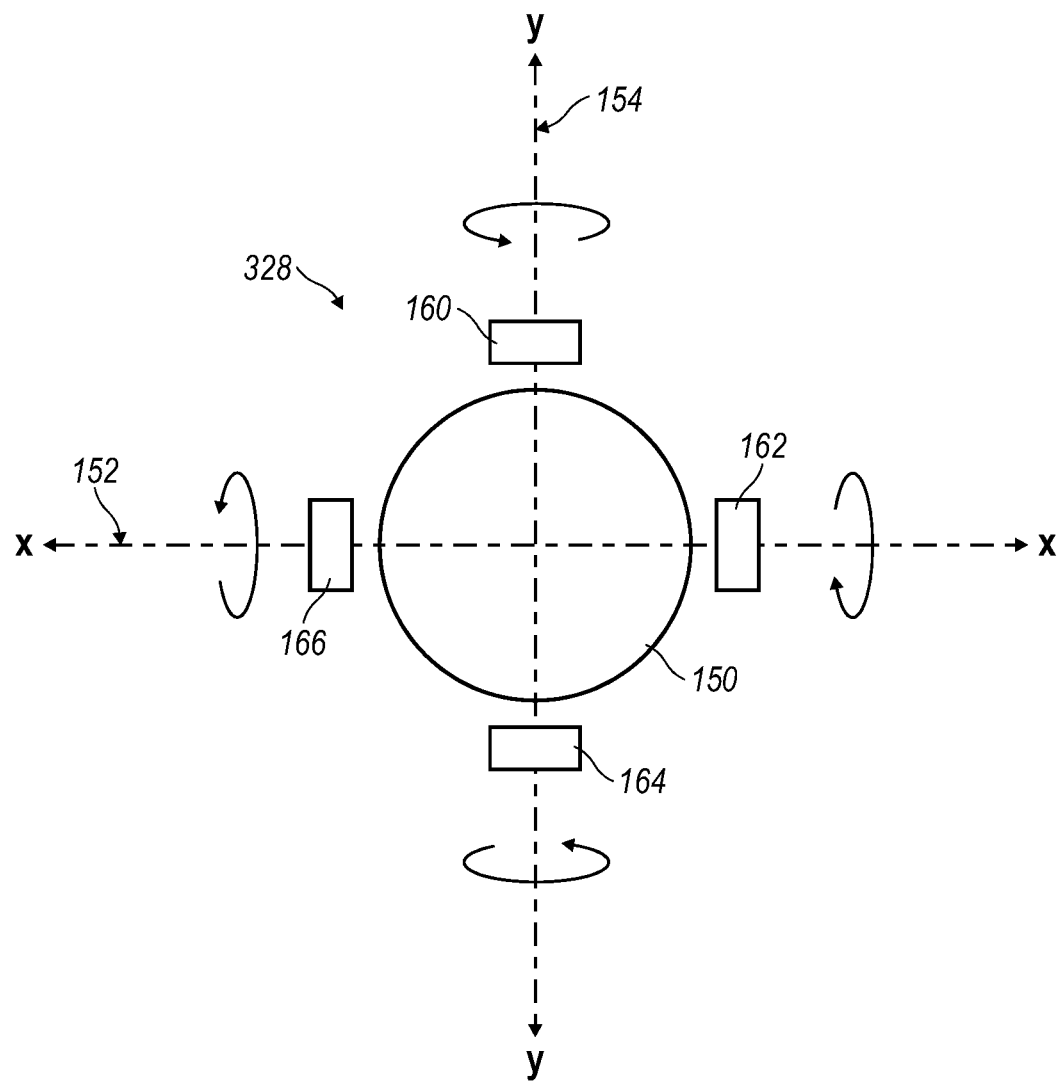
FIG. 2 is a schematic representation of an auxiliary user input in the form of a trackball.

In another embodiment, the plurality of sensors 160, 162, 164, 166 number four. A first pair of opposed sensors 162, 166 outputs signals indicative of x-component rolling motion of the trackball 150 relative to the handheld communication device 300 and about the intersecting y-axis 154. A second pair of opposed sensors 160, 164 outputs signals indicative of a y-component rolling motion of the trackball 150 relative to the handheld communication device 300 and about the intersecting x-axis 152. The four sensors 160, 162, 164, 166 are oriented radially about the trackball 150 with approximately ninety degree spacing between consecutive sensors as depicted in FIGS. 1 and 2.

Each produced x-direction signal represents a discrete amount of x-component (incremental x-direction) rolling motion of the trackball 150 relative to the handheld communication device 300 while each produced y-direction signal represents a discrete amount of y-component (incremental y-direction) rolling motion of the trackball 150 relative to the handheld communication device 300.

In a preferred embodiment, the predetermined criterion for discriminating user indicated x-direction cursor movement is identification of a threshold number of x-direction signals in a predetermined signal sample. For example, out of a moving-window sample of 10 consecutive signals, six or more must be x-signals in order to be indicative of desired x-direction cursor movement. Likewise, the predetermined criterion for discriminating user indicated y-direction cursor movement is identification of a threshold number of y-direction signals in a predetermined signal sample. The same sampling example holds, but applied to y-signals instead of x-signals. In a similar respect, the predetermined criterion for discriminating user indicated diagonal cursor movement is identification of a threshold number of x-direction signals and a threshold number of y-direction signals in a predetermined signal sample. For instance, out of a moving-window sample of 10 consecutive signals, four or more must be x-signals and four or more must be y-signals in order to be indicative of desired diagonal cursor movement. See FIG. 19 for an illustration of the last example above indicative of desired diagonal cursor movement.

In a more generic sense, it is pattern recognition software that is utilized to identify user indicated diagonal cursor movement based on analysis of a predetermined signal sample.

Figure 4:
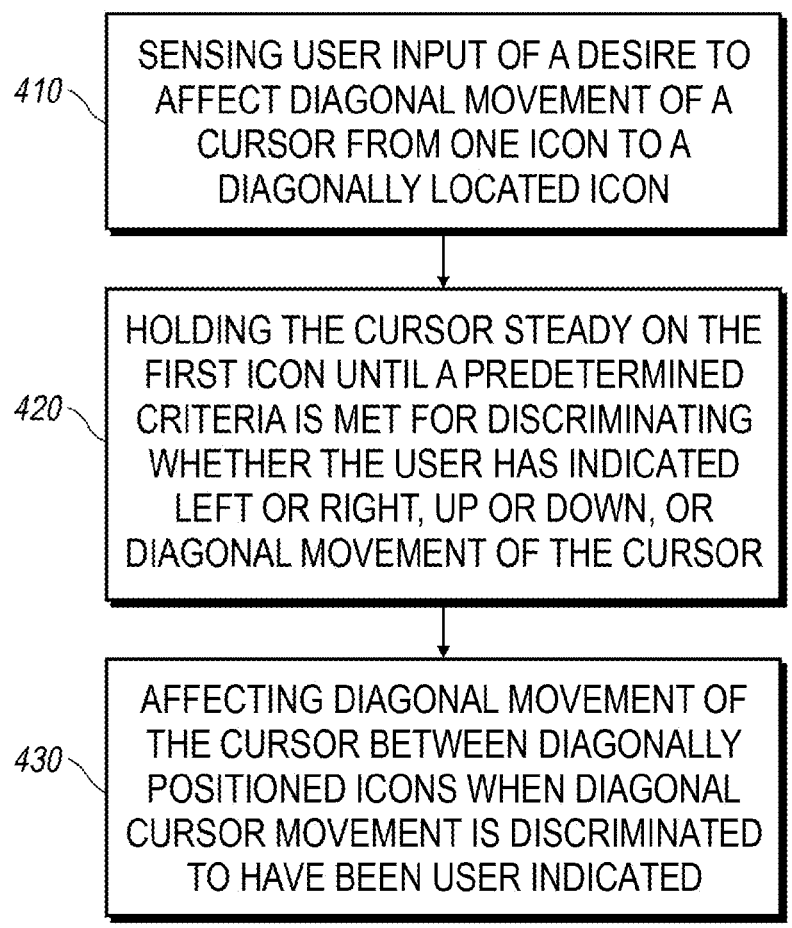
FIG. 4 is a flow chart illustrating an exemplary method for affecting diagonal movement between icons on a display screen of a wireless handheld electronic device.

Alternatively, a method is disclosed for affecting diagonal movement of a highlighting cursor 171 amongst an array of icons 170 on a display screen 322 of a handheld communication device 300, as illustrated in FIG. 4. Movement at an auxiliary user input 328 of the handheld communication device 300 is sensed and which is indicative of the user's desire to affect diagonal movement of the highlighting cursor 171 from a currently highlighted icon 172 on the display screen 322 to a diagonally located icon 174 on the display screen 322 of the handheld communication device 300 (block 410). The movement is described as being "at" the auxiliary user input 328 to cover such situations as when the input is a touchpad or similar device since no portion of that type of input device actually moves, but the user's finger indicatively moves relative thereto (across the touchpad).

As in the previously described method, x-direction signals and y-direction signals are produced based on the sensed movement at the auxiliary user input 328. Again, the highlighting cursor 171 is held steady on a presently highlighted icon 172 on the display screen 322 while processing the x-direction signals and y-direction signals until a predetermined criterion is met for discriminating whether the user has indicated movement to an icon left or right of the presently highlighted icon 172, above or below the presently highlighted icon 172, or diagonally positioned relative to the presently highlighted icon 172 (block 420). Diagonal movement of the highlighting cursor 172 is then affected between diagonally positioned icons on the display screen 322 of the handheld communication device 300 when diagonal cursor movement is discriminated to have been user indicated (block 430). In other respects, this embodiment is similar to that which has been earlier described.

In yet another embodiment, the apparatus of a handheld communication device 300 is disclosed that is capable of affecting diagonal movement of a highlighting cursor 171 amongst an array of icons 170 on a display screen 322 of the handheld communication device 300. The display screen 322 is located above a keyboard 332 suitable for accommodating textual input to the handheld communication device 300 and an auxiliary user input 328 is located essentially between the display 322 and keyboard 332. Sensors 160, 162 (164, 166) are provided that are capable of sensing movement at the auxiliary user input 328 indicative of the user's desire to affect diagonal movement of the highlighting cursor 171 from a currently highlighted icon number 172 on the display screen 322 to a diagonally located icon 174 on the display screen 322 of the handheld communication device 300. The sensors produce x-direction signals and y-direction signals based on the sensed movement at the auxiliary user input 328. A processor 338 is included that is capable of analyzing the produced x-direction signals and y-direction signals and outputting a cursor control signal that holds the highlighting cursor 171 steady on a presently highlighted icon 172 on the display screen 322 during the processing and until a predetermined criterion is met for discriminating whether the user has indicated movement to an icon left or right of the presently highlighted icon, above or below the presently highlighted icon 172, or diagonally positioned relative to the presently highlighted icon numeral 172 and then affecting diagonal movement of the highlighting cursor number 171 between diagonally positioned icons on the display screen of the handheld communication device 300 when diagonal cursor movement is discriminated to have been user indicated.

As mentioned hereinabove, there are situations in which the user will not want the X and Y signals to be converted into diagonal movement generating signals. For example, when navigating a map scene or other type of image, the finest directional movement possible from the navigation tool will be most desired; otherwise the "collection" of X and Y signals produces undesirable "jerky" cursor movement. Therefore, in at least one embodiment, the diagonal movement feature can be turned on and off by the user, or is automatically set in dependence upon the application that is being cursor-traversed.

The handheld communication device 300 comprises a radio transmitter 314 capable of transmitting data to a communication network 319 utilizing radio frequency signals and a radio receiver 312 capable of receiving data from the communication network 319 utilizing radio frequency signals.

Further aspects of the environments, devices and methods of employment described hereinabove are expanded upon in the following details. An exemplary embodiment of the handheld electronic device as shown in FIG. 1 is cradleable in the palm of a user's hand. The size of the device is such that a user is capable of operating the device using the same hand that is holding the device. In a preferred embodiment, the user is capable of actuating all features of the device using the thumb of the cradling hand. While in other embodiments, features may require the use of more than just the thumb of the cradling hand. The preferred embodiment of the handheld device features a keyboard on the face of the device, which is actuable by the thumb of the hand cradling the device. The user may also hold the device in such a manner to enable two thumb typing on the device. Furthermore, the user may use fingers rather than thumbs to actuate the keys on the device. In order to accommodate palm-cradling of the device by the average person, it is longer (height as shown in FIG. 1) than it is wide, and the width is preferably between approximately fifty and seventy-six millimeters (two and three inches), but by no means limited to such dimensions.

The handheld electronic device includes an input portion and an output display portion. The output display portion can be a display screen, such as an LCD or other similar display device.

The input portion includes a plurality of keys that can be of a physical nature such as actuable buttons or they can be of a software nature, typically constituted by virtual representations of physical key on a display screen (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof Further, depending on the application or feature in use, specific keys can be enabled or disabled.

In the case of physical keys, all or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen, a current indicia for the key may be temporarily shown nearby the key on the screen.

In the case of software keys, the indicia for the respective keys are shown on the display screen, which in one embodiment is enabled by touching the display screen, for example, with a stylus to generate the character or activate the indicated command or function. Such display screens may include one or more touch interfaces, including a touchscreen. A non-exhaustive list of touchscreens includes, for example, resistive touchscreens, capacitive touchscreens, projected capacitive touchscreens, infrared touchscreens and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device is shown on the display screen in the same configuration as the physical keys. Thus, the desired character, command or function is obtained by depressing the physical key corresponding to the character, command or function displayed at a corresponding position on the display screen, rather than touching the display screen. To aid the user, indicia for the characters, commands and/or functions most frequently used are preferably positioned on the physical keys and/or on the area around or between the physical keys. In this manner, the user can more readily associate the correct physical key with the character, command or function displayed on the display screen.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations of the English-language alphabet.

Figure 5:
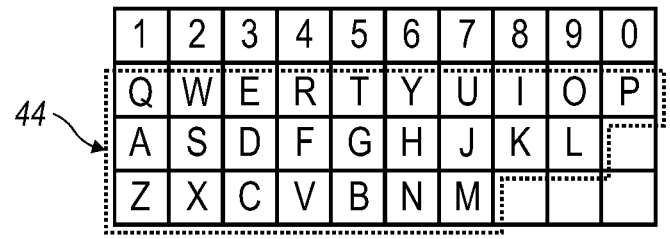
FIG. 5 illustrates an exemplary QWERTY keyboard layout.

The QWERTY keyboard layout is the standard English-language alphabetic key arrangement 44 (see FIG. 5). In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in the drawing for Sholes' patent application in 1878, U.S. Pat. No. 207,559.

Figure 6:
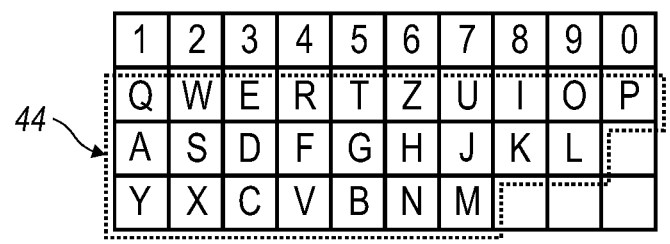
FIG. 6 illustrates an exemplary QWERTZ keyboard layout.

The QWERTZ keyboard layout is normally used in German-speaking regions. This alphabetic key arrangement 44 is shown in FIG. 6. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

Figure 7:
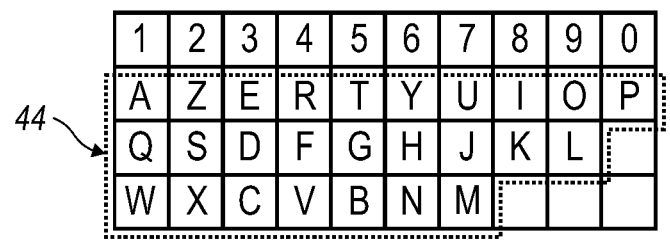
FIG. 7 illustrates an exemplary AZERTY keyboard layout.

The AZERTY keyboard layout is normally used in French-speaking regions. This alphabetic key arrangement 44 is shown in FIG. 7. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

Figures 8, 9, 10, 11:
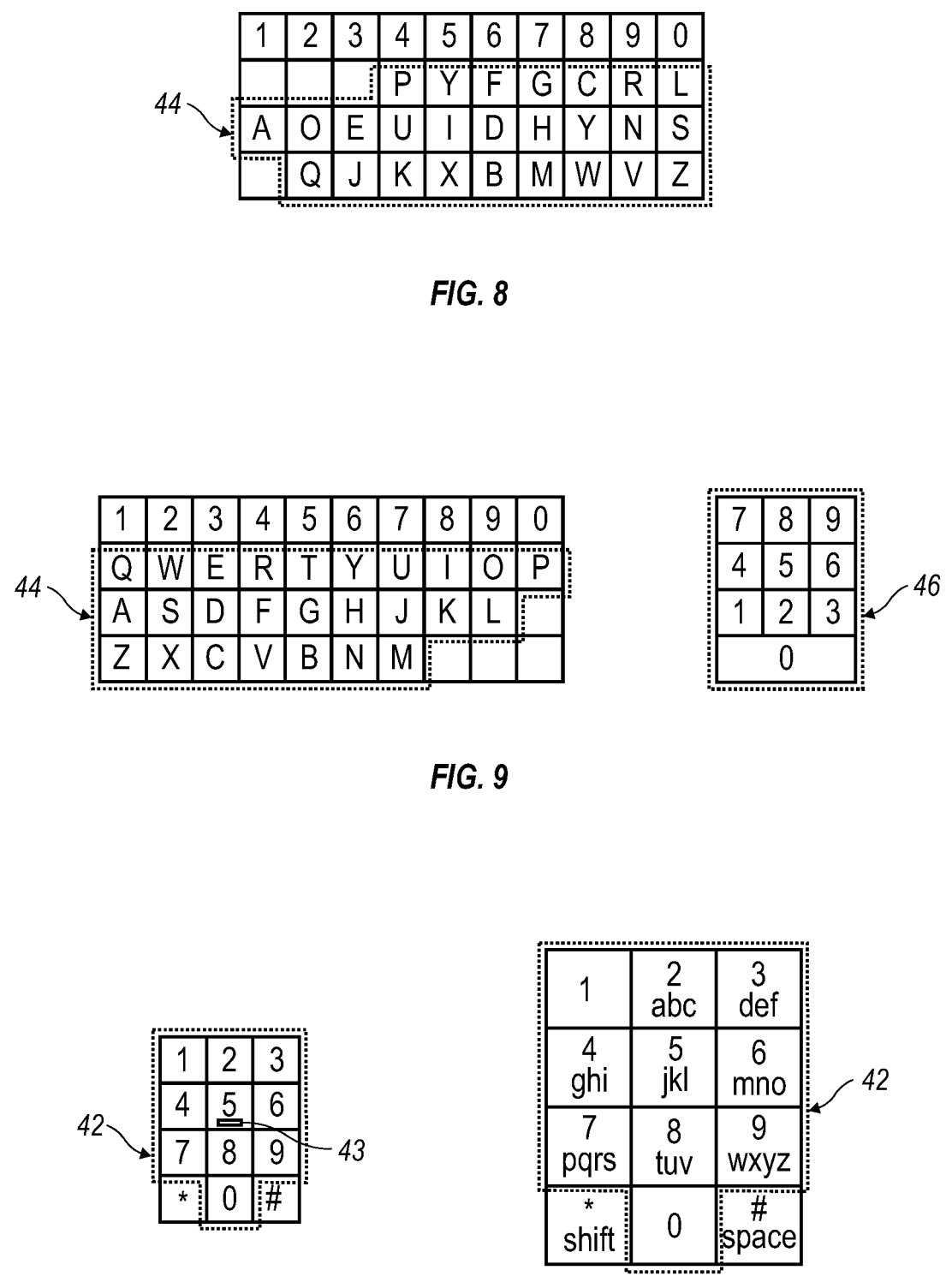

The Dvorak keyboard layout was designed in the 1930s by August Dvorak and William Dealey. This alphabetic key arrangement 44 is shown in FIG. 8. It was developed to allow a typist to type faster. About 70% of words are typed on the home row compared to about 32% with a QWERTY keyboard layout, and more words are typed using both hands. It is said that in eight hours, fingers of a QWERTY typist travel about 16 miles, but only about 1 mile for the Dvorak typist.

Alphabetic key arrangements in full keyboards and typewriters are often presented along with numeric key arrangements. An exemplary numeric key arrangement is shown in FIGS. 5-8 where the numbers 1-9 and 0 are positioned above the alphabetic keys. In another known numeric key arrangement, numbers share keys with the alphabetic characters, such as the top row of the QWERTY keyboard. Yet another exemplary numeric key arrangement is shown in FIG. 9, where a numeric keypad 46 is spaced from the alphabetic/numeric key arrangement. The numeric keypad 46 includes the numbers "7", "8", "9" arranged in a top row, "4", "5", "6" arranged in a second row, "1", "2", "3" arranged in a third row, and "0" in a bottom row, consistent with what may be found on a known "ten-key" computer keyboard keypad. Additionally, a numeric phone key arrangement 42 is also known, as shown in FIG. 10.

As shown in FIG. 10, the numeric phone key arrangement 42 may also utilize a surface treatment on the surface of the center "5" key. This surface treatment is such that the surface of the key is distinctive from the surface of other keys. Preferably the surface treatment is in the form of a raised bump or recessed dimple 43. This bump or dimple 43 is typically standard on telephones and is used to identify the "5" key through touch alone. Once the user has identified the "5" key, it is possible to identify the remainder of the phone keys through touch alone because of their standard placement. The bump or dimple 43 preferably has a shape and size that is readily evident to a user through touch. An example bump or dimple 43 may be round, rectangular, or have another shape if desired. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such mobile communication devices include mobile stations, cellular telephones, wireless personal digital assistants (PDAs), two-way paging devices, and others. Various keyboards are used with such devices depending in part on the physical size of the handheld electronic device. Some of these are termed full keyboard, reduced keyboard, and phone key pads.

In embodiments of a handheld electronic device having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, and with the QWERTY keyboard layout being the most common.

One device that uses a full keyboard for alphabetic characters and incorporates a combined numeric keyboard is shown in FIG. 12. In this device, numeric characters share keys with alphabetic characters on the top row of the QWERTY keyboard. Another device that incorporates a combined alphabetic/numeric keyboard is shown in FIG. 13. This device utilizes numeric characters in a numeric phone key arrangement consistent with the ITU Standard E. 161, as shown in FIG. 10. The numeric characters share keys with alphabetic characters on the left side of the keyboard.

In order to further reduce the size of a handheld electronic device without making the physical keys or software keys too small, some handheld electronic devices use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor of these types handheld electronic device to determine or predict what letter or word has been intended by the user. Predictive text technologies can also automatically correct common spelling errors. Predictive text methodologies often include a disambiguation engine and/or a predictive editor application. This helps facilitate easy spelling and composition, since the software is preferably intuitive software with a large word list and the ability to increase that list based on the frequency of word usage.

The software preferably also has the ability to recognize character letter sequences that are common to the particular language, such as, in the case of English, words ending in "ing." Such systems can also "learn" the typing style of the user making note of frequently used words to increase the predictive aspect of the software. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

The multi-tap method of character selection has been in use a number of years for permitting users to enter text using a touch screen device or a conventional telephone key pad such as specified under ITU E 1.161, among other devices. Multi-tap requires a user to press a key a varying number of times, generally within a limited period of time, to input a specific letter, thereby spelling the desired words of the message. A related method is the long tap method, where a user depresses the key until the desired character appears on the display out of a rotating series of letters.

A "text on nine keys" type system uses predictive letter patterns to allow a user to ideally press each key representing a letter only once to enter text. Unlike multi-tap which requires a user to indicate a desired character by a precise number of presses of a key, or keystrokes, the "text-on-nine-keys" system uses a predictive text dictionary and established letter patterns for a language to intelligently guess which one of many characters represented by a key that the user intended to enter. The predictive text dictionary is primarily a list of words, acronyms, abbreviations and the like that can be used in the composition of text.

Generally, all possible character string permutations represented by a number of keystrokes entered by a user are compared to the words in the predictive text dictionary and a subset of the permutations is shown to the user to allow selection of the intended character string. The permutations are generally sorted by likelihood of occurrence which is determined from the number of words matched in the predictive text dictionary and various metrics maintained for these words. Where the possible character string permutations do not match any words in the predictive text dictionary, the set of established letter patterns for a selected language can be applied to suggest the most likely character string permutations, and then require the user to input a number of additional keystrokes in order to enter the desired word.

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

Figure 14:
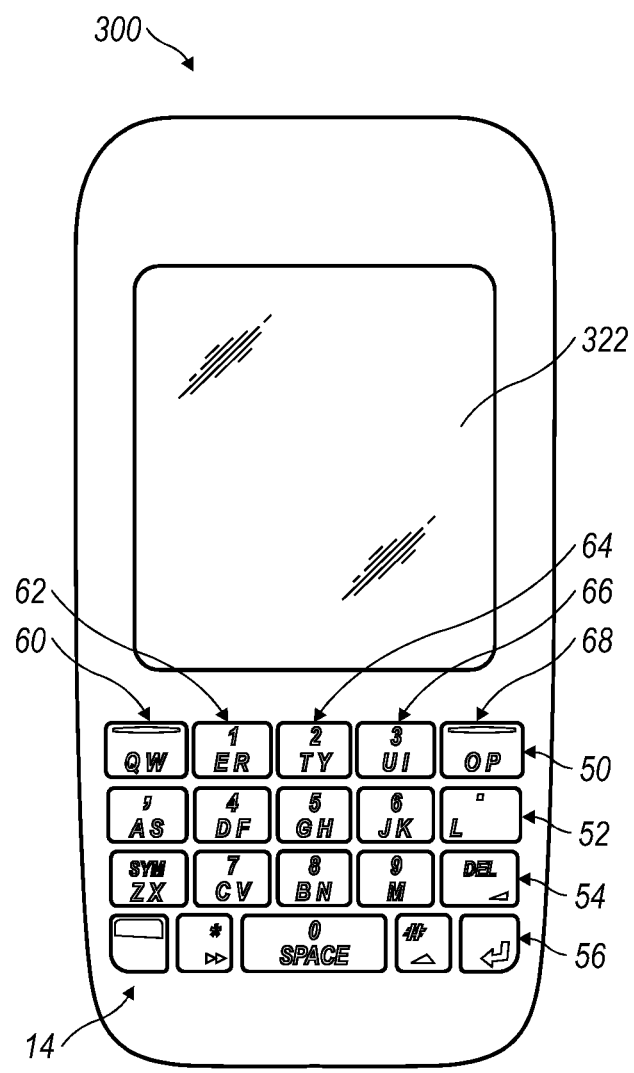
FIG. 14 is a front view of an exemplary handheld electronic device including a reduced QWERTY keyboard.

FIG. 14 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 14. The four rows include a first row 50, a second row 52, a third row 54, and a fourth row 56. The five columns include a first column 60, a second column 62, a third column 64, a fourth column 66, and a fifth column 68. Each of the keys in the first row 50, second row 52, and third row 54 is uniformly sized while the keys in the fourth, bottom row 56 have different sizes relative to one another and to the keys in the first three rows 50, 52, 54. The rows and columns are straight, although the keys in the fourth row 56 do not align completely with the columns because of their differing sizes. The columns substantially align with the longitudinal axis x-x of the device 300.

Figure 15:
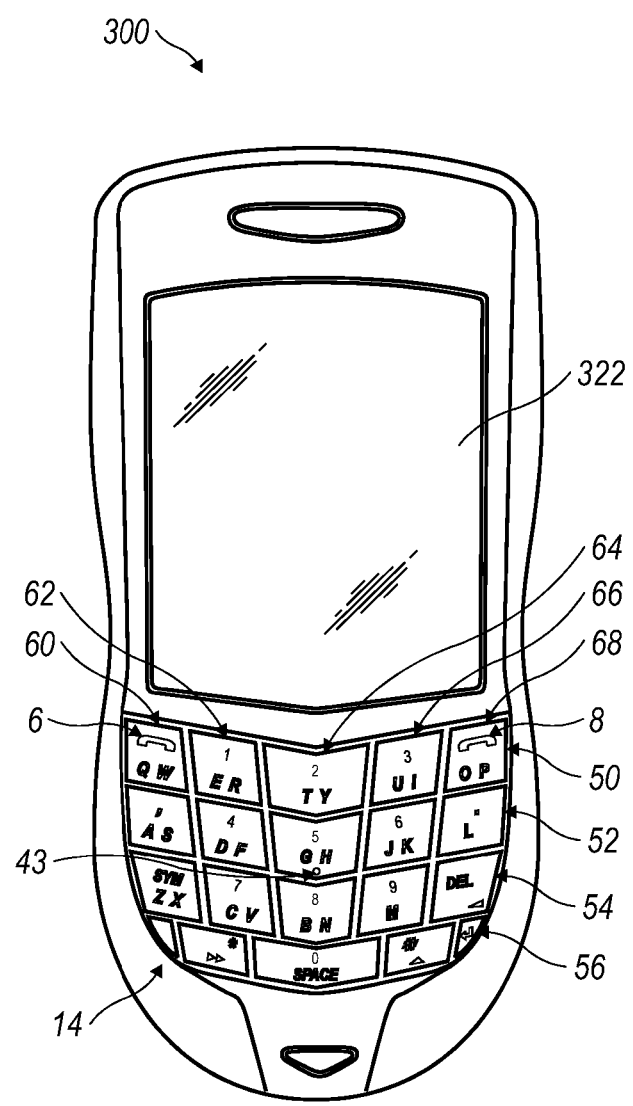
FIG. 15 is an elevational view of the front face of another exemplary handheld electronic device including a reduced QWERTY keyboard.
Figure 16:
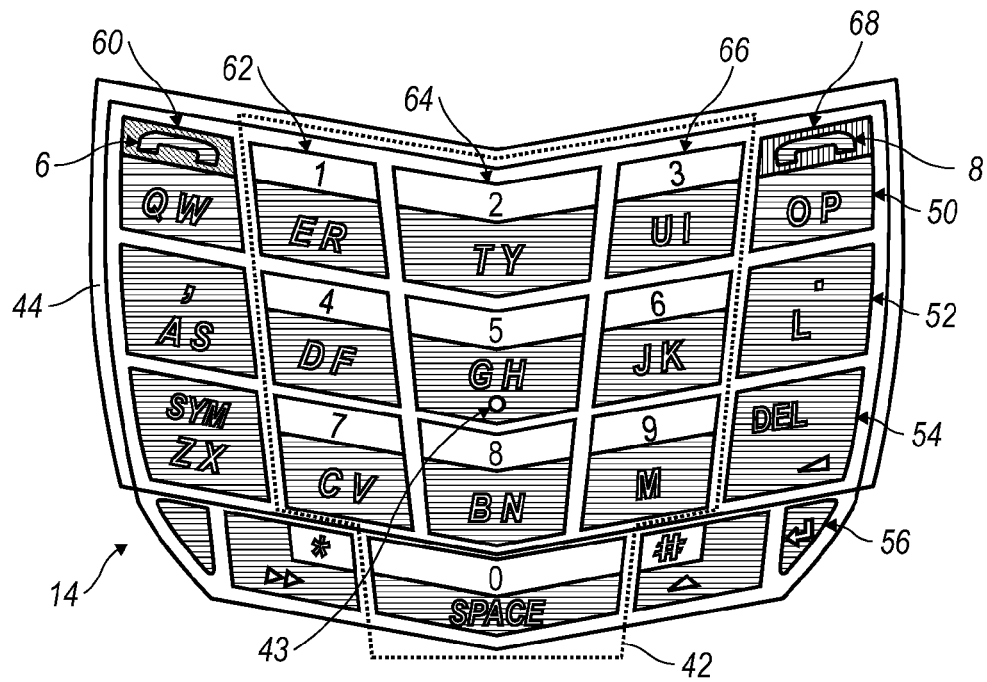
FIG. 16 is a detail view of the reduced QWERTY keyboard of device of FIG. 15.

FIG. 15 shows a handheld electronic device 300 that has an example physical keyboard array of 20 keys, with five columns and four rows. An exploded view of the keyboard is presented in FIG. 16. Fourteen keys on the keyboard 14 are associated with alphabetic characters and ten keys are associated with numbers. The four rows include a first row 50, a second row 52, a third row 54, and a fourth row 56. The five columns include a first column 60, a second column 62, a third column 64, a fourth column 66, and a fifth column 68. Many of the keys have different sizes than the other keys, and the rows are non-linear. In particular, the rows are V-shaped, with the middle key in the third column 64 representing the point of the V. The columns are generally straight, but the outer two columns 60, 62, 66, 68 angle inwardly toward the middle column 64. To readily identify the phone user interface (the second user interface), the numeric phone keys 0-9 include a color scheme that is different from that of the remaining keys associated with the QWERTY key arrangement.

In this example, the color scheme of the numeric phone keys has a two tone appearance, with the upper portion of the numeric keys being a first color and the lower portion of the numeric keys being a second color. In the example, the upper portion of the keys is white with blue letters and the lower portion of the keys is blue with white letters. Most of the remaining keys associated with the QWERTY key arrangement are predominantly the second, blue color with white lettering. The first color may be lighter than the second color, or darker than the second color. In addition, the keyboard 14 includes a "send" key 6 and an "end" key 8. The "send" key 6 is positioned in the upper left corner of the keyboard 14 and the "end" key 8 is positioned in the upper right corner. The "send" key 6 and "end" key 8 may have different color schemes than the remainder of the keys in order to distinguish them from other keys. In addition, the "send" and "end" keys 6, 8 may have different colors from one another. In the example shown, the "send" key 6 is green and the "end" key 8 is red. Different colors may be utilized, if desired.

Figure 17:
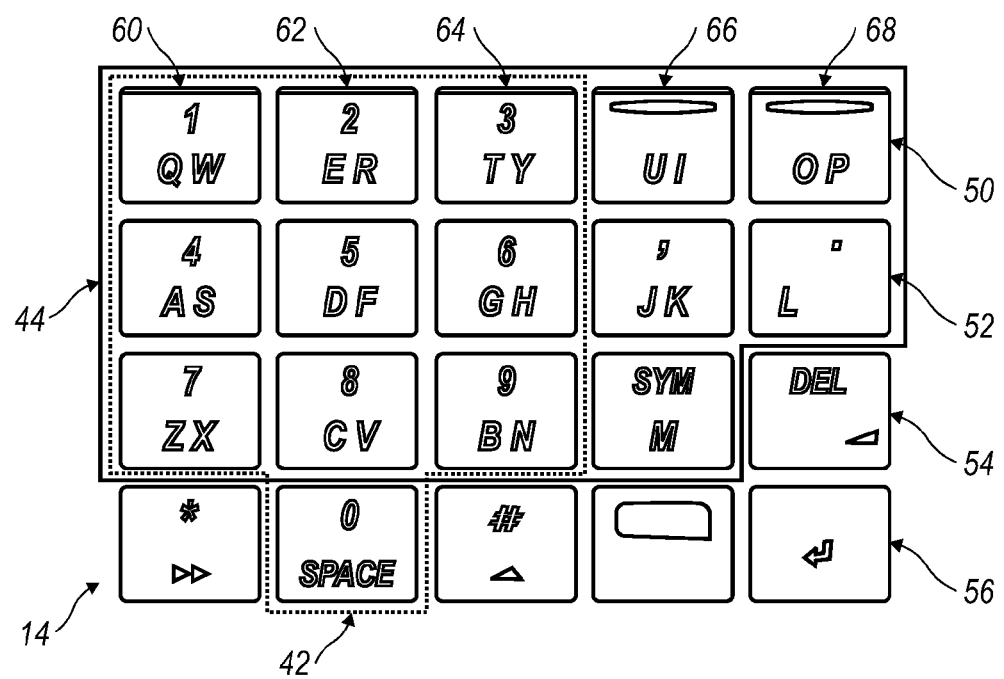
FIG. 17 is a detail view of an alternative reduced QWERTY keyboard.

FIG. 17 shows a similar format for the reduced QWERTY arrangement of alphabetic characters 44 as presented in FIG. 14, but the numeric phone key arrangement 42 is positioned in the first 60, second 62, and third 64 columns instead of being centered on the keyboard 14. The first row 50 of keys includes in order the following key combinations for the text entry and telephony mode: "QW/1", "ER/2", "TY/3", "UI", and "OP". The second row 52 includes the following key combinations in order: "AS/4", "DF/5", "GH/6", "JK", and "L/." The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows are of uniform size and the rows and columns are straight.

Another embodiment of a reduced alphabetic keyboard is found on a standard phone keypad. Most handheld electronic devices having a phone key pad also typically include alphabetic key arrangements overlaying or coinciding with the numeric keys as shown in FIG. 11. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 10 (no alphabetic letters) and 11 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

The table below identifies the alphabetic characters associated with each number for some other phone keypad conventions.

| Number on Key | ITU E.161 | Australia | #1 | Mobile Phone Keypad #11 (Europe) | #111 (Europe) |
|---|---|---|---|---|---|
| 1 | | QZ | | ABC | ABC |
| 2 | ABC | ABC | ABC | DEF | DEF |
| 3 | DEF | DEF | DEF | GHI | GHI |
| 4 | GHI | GHI | GHI | JKL | JKL |
| 5 | JKL | JKL | JKL | MNO | MNO |
| 6 | MNO | MNO | MN | PQR | PQR |
| 7 | PQRS | PRS | PRS | STU | STU |
| 8 | TUV | TUV | TUV | úvw | VWX |
| 9 | WXYZ | WXY | WXY | XYZ | YZ |
| 0 | | | | OQZ | |

It should also be appreciated that other alphabetic character and number combinations can be used beyond those identified above when deemed useful to a particular application.

As noted earlier, multi-tap software has been in use for a number of years permitting users to enter text using a conventional telephone key pad such as specified under ITU E 1.161 or on a touch screen display, among other devices. Multi-tap requires a user to press key a varying number of times, generally within a limited period of time, to input a specific letter associated with the particular key, thereby spelling the desired words of the message. A related method is the long tap method, where a user depresses the key until the desired character appears on the display.

Figure 3:
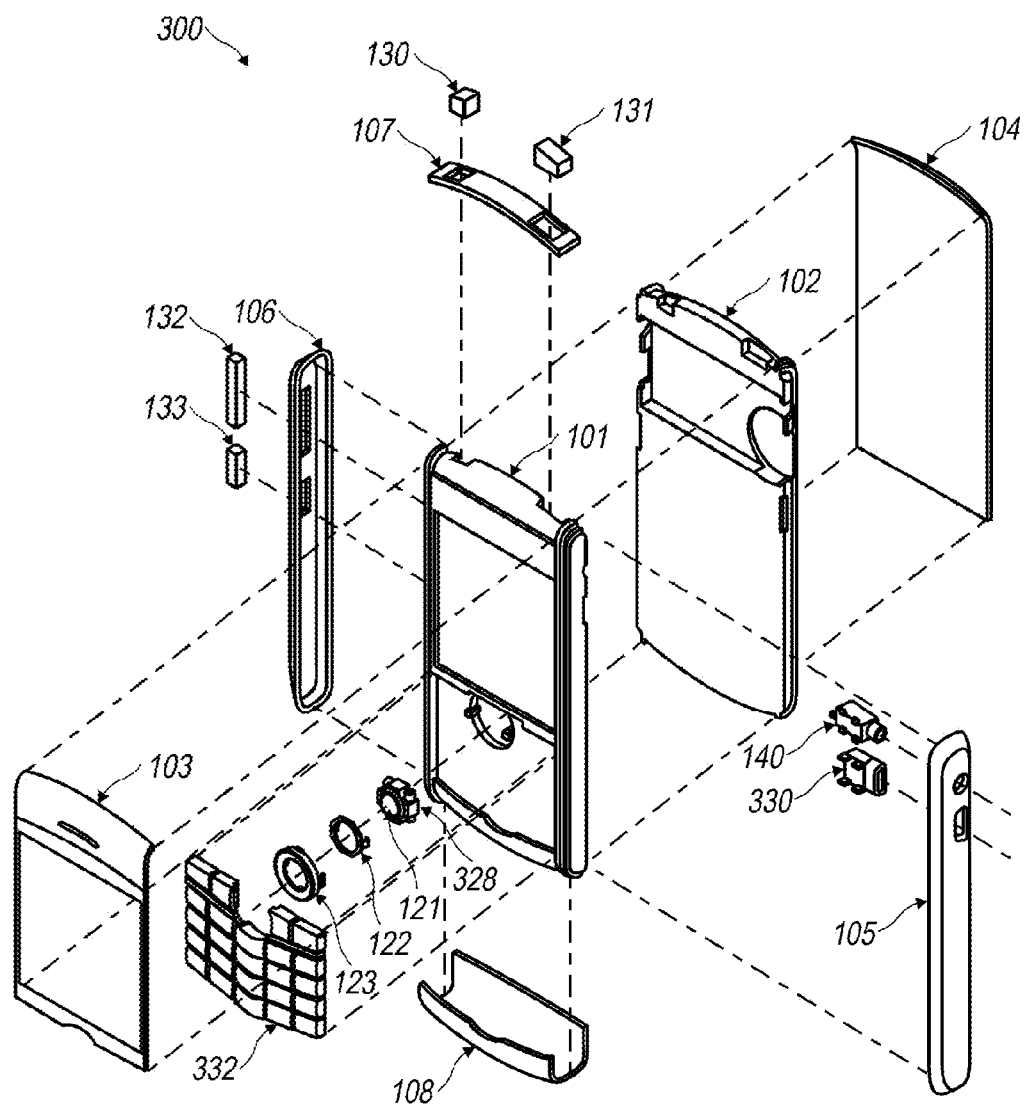
FIG. 3 is an exploded perspective view of an exemplary wireless handheld electronic device incorporating a trackball assembly as at the auxiliary user input.

An exemplary handheld electronic device is shown in the assembly drawing of FIG. 3 and its cooperation in a wireless network is exemplified in the block diagram of FIG. 18. These figures are exemplary only, and those persons skilled in the art will appreciate the additional elements and modifications necessary to make the device work in particular network environments.

FIG. 3 is an exploded view showing some of the typical components found in the assembly of the handheld electronic device. The construction of the device benefits from various manufacturing simplifications. The internal components are constructed on a single PCB (printed circuit board) 102. The keyboard 332 is constructed from a single piece of material, and in a preferred embodiment is made from plastic. The keyboard 332 sits over dome switches (not shown) located on the PCB 102 in a preferred embodiment. One switch is provided for every key on the keyboard in the preferred embodiment, but in other embodiments more than one switch or less than one switch per key are possible configurations. The support frame 101 holds the keyboard 332 and navigation tool 328 in place above the PCB 102. The support frame 101 also provides an attachment point for the display (not shown). A lens 103 covers the display to prevent damage. When assembled, the support frame 101 and the PCB 102 are fixably attached to each other and the display is positioned between the PCB 102 and support frame 101.

The navigation tool 328 is frictionally engaged with the support frame 101, but in a preferred embodiment the navigation tool 328 is removable when the device is assembled. This allows for replacement of the navigation tool 328 if/when it becomes damaged or the user desires replacement with a different type of navigation tool 328. In the exemplary embodiment of FIG. 3, the navigation tool 328 is a ball 121 based device. Other navigation tools 328 such as joysticks, four-way cursors, or touch pads are also considered to be within the scope of this disclosure. When the navigation tool 328 has a ball 121, the ball 121 itself can be removed without removal of the navigation tool 328. The removal of the ball 121 is enabled through the use of an outer removable ring 123 and an inner removable ring 122. These rings 122, 123 ensure that the navigation tool 328 and the ball 121 are properly held in place against the support frame 101.

A serial port (preferably a Universal Serial Bus port) 330 and an earphone jack 140 are fixably attached to the PCB 102 and further held in place by right side element 105. Buttons 130-133 are attached to switches (not shown), which are connected to the PCB 102.

Final assembly involves placing the top piece 107 and bottom piece 108 in contact with support frame 101. Furthermore, the assembly interconnects right side element 105 and left side element 106 with the support frame 101, PCB 102, and lens 103. These side elements 106, 105 provide additional protection and strength to the support structure of the device 300. In a preferred embodiment, backplate 104 is removably attached to the other elements of the device.

The block diagram of FIG. 18 representing the communication device 300 interacting in the communication network 319 shows the device's 300 inclusion of a microprocessor 338 which controls the operation of the device 300. The communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is that of a short range communication subsystem such as BLUE-TOOTH® communication module or an infrared device and associated circuits and components. Additionally, the microprocessor 338 is able to perform operating system functions and preferably enables execution of software applications on the communication device 300.

The above described auxiliary I/O subsystem 328 can take a variety of different subsystems including the above described navigation tool 328. As previously mentioned, the navigation tool 328 is preferably a trackball based device, but it can be any one of the other above described tools. Other auxiliary I/O devices can include external display devices and externally connected keyboards (not shown). While the above examples have been provided in relation to the auxiliary I/O subsystem, other subsystems capable of providing input or receiving output from the handheld electronic device 300 are considered within the scope of this disclosure.

In a preferred embodiment, the communication device 300 is designed to wirelessly connect with a communication network 319. Some communication networks that the communication device 300 may be designed to operate on require a subscriber identity module (SIM) or removable user identity module (RUIM). Thus, a device 300 intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and data 356 can be segregated upon storage in the flash memory 324 of the device 300. However, another embodiment of the flash memory 324 utilizes a storage allocation method such that a program 358 is allocated additional space in order to store data associated with such program. Other known allocation methods exist in the art and those persons skilled in the art will appreciate additional ways to allocate the memory of the device 300.

In a preferred embodiment, the device 300 is pre-loaded with a limited set of programs that enable it to operate on the communication network 319. Another program that can be preloaded is a PIM 354 application that has the ability to organize and manage data items including but not limited to email, calendar events, voice messages, appointments and task items. In order to operate efficiently, memory 324 is allocated for use by the PIM 354 for the storage of associated data. In a preferred embodiment, the information that PIM 354 manages is seamlessly integrated, synchronized and updated through the communication network 319 with a user's corresponding information on a remote computer (not shown). The synchronization, in another embodiment, can also be performed through the serial port 330 or other short range communication subsystem 340. Other applications may be installed through connection with the wireless network 319, serial port 330 or via other short range communication subsystems 340.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrowband, data-only technologies mainly used for short burst wireless data transfer.

For the systems listed above, the communication device 300 must be properly enabled to transmit and receive signals from the communication network 319. Other systems may not require such identifying information. A GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. In some locations, the communication device 300 will be enabled to work with special services, such as "911" emergency, without a SIM/RUIM or with a non-functioning SIM/RUIM card. A SIM/RUIM interface 344 located within the device allows for removal or insertion of a SIM/RUIM card (not shown). This interface 344 can be configured like that of a disk drive or a PCMCIA slot or other known attachment mechanism in the art. The SIM/RUIM card features memory and holds key configurations 351, and other information 353 such as identification and subscriber related information. Furthermore, a SIM/RUIM card can be enabled to store information about the user including identification, carrier and address book information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

A signal received by the communication device 300 is first received by the antenna 316 and then input into a receiver 312, which in a preferred embodiment is capable of performing common receiver functions including signal amplification, frequency down conversion, filtering, channel selection and the like, and analog to digital (A/D) conversion. The A/D conversion allows the DSP 320 to perform more complex communication functions such as demodulation and decoding on the signals that are received by DSP 320 from the receiver 312. The DSP 320 is also capable of issuing control commands to the receiver 312. An example of a control command that the DSP 320 is capable of sending to the receiver 312 is gain control, which is implemented in automatic gain control algorithms implemented in the DSP 320. Likewise, the communication device 300 is capable of transmitting signals to the communication network 319. The DSP 320 communicates the signals to be sent to the transmitter 314 and further communicates control functions, such as the above described gain control. The signal is emitted by the device 300 through an antenna 318 connected to the transmitter 314.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

In the instance of voice communications, voice transmissions that originate from the communication device 300 enter the device 300 though a microphone 336. The microphone 336 communicates the signals to the microprocessor 338 for further conditioning and processing. The microprocessor 338 sends the signals to the DSP 320 which controls the transmitter 314 and provides the correct signals to the transmitter 314. Then, the transmitter 314 sends the signals to the antenna 318, which emits the signals to be detected by a communication network 319. Likewise, when the receiver 312 obtains a signal from the receiving antenna 316 that is a voice signal, it is transmitted to the DSP 320 which further sends the signal to the microprocessor 338. Then, the microprocessor 338 provides a signal to the speaker 334 of the device 300 and the user can hear the voice communication that has been received. The device 300 in a preferred embodiment is enabled to allow for full duplex voice transmission.

In another embodiment, the voice transmission may be received by the communication device 300 and translated as text to be shown on the display screen 322 of the communication device 300. The communication device 300 is also capable of retrieving messages from a voice messaging service operated by the communication network operator. In a preferred embodiment, the device 300 displays information in relation to the voice message, such as the number of voice messages or an indication that a new voice message is present on the operating system.

In a preferred embodiment, the display 322 of the communication device 300 provides an indication about the identity of an incoming call, duration of the voice communication, telephone number of the communication device, call history, and other related information. It should be appreciated that the above described embodiments are given as examples only and one skilled in the art may effect alterations, modifications and variations to the particular embodiments without departing from the scope of the application.

As stated above, the communication device 300 and communication network 319 can be enabled to transmit, receive and process data. Several different types of data exist and some of these types of data will be described in further detail. One type of data communication that occurs over the communication network 319 includes electronic mail (email) messages. Typically an email is text based, but can also include other types of data such as picture files, attachments and html. While these are given as examples, other types of messages are considered within the scope of this disclosure as well.

When the email originates from a source outside of the device and is communicated to the device 300, it is first received by the receiving antenna 316 and then transmitted to the receiver 312. From the receiver 312, the email message is further processed by the DSP 320, and it then reaches the microprocessor 338. The microprocessor 338 executes instructions as indicated from the relevant programming instructions to display, store or process the email message as directed by the program. In a similar manner, once an email message has been properly processed by the microprocessor 338 for transmission to the communication network 319, it is first sent to the DSP 320, which further transmits the email message to the transmitter 314. The transmitter 314 processes the email message and transmits it to the transmission antenna 318, which broadcasts a signal to be received by a communication network 319. While the above has been described generally, those skilled in this art will appreciate those modifications which are necessary to enable the communication device 300 to properly transmit the email message over a given communication network 319.

Furthermore, the email message may instead be transmitted from the device 300 via a serial port 330, another communication port 340, or other wireless communication ports 340. The user of the device 300 can generate a message to be sent using the keyboard 332 and/or auxiliary I/O 328, and the associated application to generate the email message. Once the email message is generated, the user may execute a send command which directs the email message from the communication device 300 to the communication network 319. In an exemplary embodiment, a keyboard 332, preferably an alphanumeric keyboard, is used to compose the email message. In a preferred embodiment, an auxiliary I/O device 328 is used in addition to the keyboard 332.

While the above has been described in relation to email messages, one skilled in the art could easily modify the procedure to function with other types of data such as SMS text messages, internet websites, videos, instant messages, programs and ringtones. Once the data is received by the microprocessor 338, the data is placed appropriately within the operating system of the device 300. This might involve presenting a message on the display 322 which indicates the data has been received or storing it in the appropriate memory 324 on the device 300. For example, a downloaded application such as a game will be placed into a suitable place in the flash memory 324 of the device 300. The operating system of the device 300 will also allow for appropriate access to the new application as downloaded.

Exemplary embodiments have been described hereinabove regarding both wireless handheld electronic devices, as well as the communication networks within which they cooperate. It should be appreciated, however, that a focus of the present disclosure is the enablement of a user of such wireless handheld electronic devices to navigate diagonally across screen icon arrays and such things as spreadsheet cell matrices.

What is claimed is:

1. A method for affecting diagonal movement of a cursor on a display screen disposed on a handheld communication device having an auxiliary user input, the method comprising:

sensing a set of direct diagonal physical movements at an auxiliary user input of a handheld communication device indicating diagonal movement of a cursor on a display screen of the handheld communication device;

producing a set of x-direction signals and y-direction signals based on the set of direct diagonal physical movements that has been sensed at the auxiliary user input;

analyzing a signal sample from the produced set of x-direction signals and y-direction signals to identify in the signal sample a signal pattern of x-direction signals and y-direction signals matching a criterion of a defined number of x-direction signals and a defined number of y-direction signals out of a total number of signals in the signal sample, the identified signal pattern that matches the criterion identifying user-indicated diagonal cursor movement discriminated from whether the user has indicated x-direction cursor movement, y-direction cursor movement, or diagonal cursor movement;

holding, the cursor stationary on the display screen while processing the x-direction signals and y-direction signals and while analyzing the signal sample from the produced set of x-direction signals and y-direction signals to identify the signal pattern matching the criterion; and affecting diagonal cursor movement on the display screen in response to determining that the analyzing identified in the signal sample the signal pattern matching the criterion identifying user-indicated diagonal cursor movement.

2. The method as recited in claim 1, wherein the handheld communication device transmits data to, and receives data from, a communication network utilizing radio frequency signals.

3. The method as recited in claim 1, wherein the handheld communication device comprises a keyboard suitable for accommodating textual input to the handheld communication device, the keyboard comprising a plurality of keys with which alphabetic letters are associated, one letter per key.

4. The method as recited in claim 1, wherein the auxiliary user input comprises a trackball and wherein the set of direct diagonal physical movements occurs at the trackball and is assessed using a plurality of sensors that quantify rotational motion of the trackball about an intersecting x-axis and an intersecting y-axis of the trackball.

5. The method as recited in claim 4, wherein the plurality of sensors number two sensors, one of the two sensors outputting signals indicative of x-component rolling motion of the trackball relative to the handheld communication device and about the intersecting y-axis of the trackball and another of the two sensors outputting signals indicative of y-component rolling motion of the trackball relative to the handheld communication device and about the intersecting x-axis of the trackball.

6. The method as recited in claim 5, wherein the two sensors are oriented radially about the trackball with approximately ninety degree spacing therebetween.

7. The method as recited in claim 6, wherein each of the two sensors comprises a hall effect sensor located proximate said trackball.

8. The method as recited in claim 4, wherein the plurality of sensors number four sensors, a first pair of opposed sensors outputting signals indicative of x-component rolling motion of the trackball relative to the handheld communication device and about the intersecting y-axis of the trackball and a second pair of opposed sensors outputting signals indicative of a y-component rolling motion of the trackball relative to the handheld communication device and about the intersecting x-axis of the trackball.

9. The method as recited in claim 8, wherein the four sensors are oriented radially about the trackball with approximately ninety degree spacing between consecutive sensors.

10. The method as recited in claim 9, wherein each of the four sensors comprises a hall effect sensor located proximate said trackball.

11. The method as recited in claim 4, wherein each produced x-direction signal represents a discrete amount of x-component rolling motion of the trackball relative to the handheld communication device and each produced y-direction signal represents a discrete amount of y-component rolling motion of the trackball relative to the handheld communication device.

12. The method as recited in claim 1, wherein pattern recognition software is utilized to analyze the signal sample to identify the signal pattern matching the criterion identifying user-indicated diagonal cursor movement.

13. A method for affecting diagonal movement of a highlighting cursor amongst an array of icons on a display screen of a handheld communication device having an auxiliary user input, the method comprising:

sensing movement at an auxiliary user input of the handheld communication device indicative of affecting diagonal movement of the highlighting cursor from a presently highlighted icon on the display screen to a diagonally located icon on the display screen of the handheld communication device;

producing x-direction signals and y-direction signals based on the sensed movement at the auxiliary user input;

analyzing a signal sample from the produced x-direction signals and y-direction signals to identify in the signal sample a signal pattern of x-direction signals and y-direction signals matching a criterion of a defined number of x-direction signals and a defined number of y-direction signals out of a total number of signals in the signal sample, the identified signal pattern that matches the criterion identifying user-indicated diagonal movement of the highlighting cursor to an icon diagonally positioned relative to the presently highlighted icon, the identified user-indicated diagonal movement being discriminated from whether the user has indicated x-direction movement of the highlighting cursor to an icon left or right of the presently highlighted icon, y-direction movement of the highlighting cursor to an icon above or below the presently highlighted icon, or diagonal movement of the highlighting cursor to an icon diagonally positioned relative to the presently highlighted icon;

holding the highlighting cursor steady on the presently highlighted icon on the display screen while processing the x-direction signals and y-direction signals and while analyzing the signal sample from the produced set of x-direction signals and y-direction signals to identify the signal pattern matching the criterion; and affecting diagonal movement of the highlighting cursor from the presently highlighted icon to a diagonally positioned icon on the display screen of the handheld communication device in response to determining that the analyzing identified in the signal sample the signal pattern matching the criterion identifying user-indicated diagonal movement of the highlighting cursor.

14. The method as recited in claim 13, wherein the handheld communication device transmits data to, and receives data from, a communication network utilizing radio frequency signals.

15. The method as recited in claim 13, wherein the display screen is located above an alphabetic keyboard suitable for accommodating textual input to the handheld communication device when the handheld communication device is in an operable configuration, the auxiliary user input being located essentially between the display screen and the alphabetic keyboard in the operable configuration.

16. The method as recited in claim 13 wherein the auxiliary user input comprises a touchpad.

17. The method as recited in claim 13 wherein the auxiliary user input comprises a touch screen.

18. The method as recited in claim 13 wherein the handheld communication device comprises a keyboard suitable for accommodating textual input to the handheld communication device, the keyboard comprising a plurality of keys with which alphabetic letters are associated, one letter per key.

19. The method of claim 13, wherein the processing of the x-direction signals and y-direction signals and the analyzing is performed with a processor according to a resident computer program, and wherein the criterion is a user definable condition.

20. A handheld communication device capable of affecting movement of a cursor on a display screen of the handheld communication device, the handheld communication device comprising at least:
   a display screen;
   an auxiliary user input; and
   a processor communicatively coupled to the display screen and the auxiliary user input, the processor configured to perform a method comprising:
      sensing a set of direct diagonal physical movements at an auxiliary user input of a handheld communication device indicating diagonal movement of a cursor on a display screen of the handheld communication device;
      producing a set of x-direction signals and y-direction signals based on the set of direct diagonal physical movements that has been sensed at the auxiliary user input;
   analyzing a signal sample from the produced set of x-direction signals and y-direction signals to identify in the signal sample a signal pattern of x-direction signals and y-direction signals matching a criterion of a defined number of x-direction signals and a defined number of y-direction signals out of a total number of signals in the signal sample, the identified signal pattern that matches the criterion identifying user-indicated diagonal cursor movement discriminated from whether the user has indicated x-direction cursor movement, y-direction cursor movement, or diagonal cursor movement;
      holding, the cursor stationary on the display screen while processing the x-direction signals and y-direction signals and while analyzing the signal sample from the produced set of x-direction signals and y-direction signals to identify the signal pattern matching the criterion; and
      affecting diagonal cursor movement on the display screen in response to determining that the analyzing identified in the signal sample the signal pattern matching the criterion identifying user-indicated diagonal cursor movement 21. The handheld communication device as recited in claim 20, further comprising a plurality of sensors capable of sensing movement at the auxiliary user input indicative of the user's desire to affect cursor movement on the display screen, and wherein each sensor comprises a hall effect sensor located proximate the auxiliary user input.

22. The handheld communication device as recited in claim 20, further comprising a radio transmitter capable of transmitting data to a communication network utilizing radio frequency signals and a radio receiver capable of receiving data from the communication network utilizing radio frequency signals.

23. The handheld communication device as recited in claim 20, wherein the auxiliary user input comprises a touchpad.

24. The handheld communication device as recited in claim 20, wherein the auxiliary user input comprises a touch screen.

25. The handheld communication device as recited in claim 20, wherein the handheld communication device comprises a keyboard suitable for accommodating textual input to the handheld communication device, the keyboard comprising a plurality of keys with which alphabetic letters are associated, one letter per key.

26. The device of claim 20, wherein the processor performs the processing of the x-direction signals and y-direction signals and the analyzing according to a resident computer program, and wherein the criterion is a user definable condition.

* * * * *